US011016904B2

(12) United States Patent
Cho et al.

(10) Patent No.: US 11,016,904 B2
(45) Date of Patent: May 25, 2021

(54) STORAGE DEVICE FOR PERFORMING MAP SCHEDULING AND ELECTRONIC DEVICE INCLUDING THE SAME

(71) Applicant: SAMSUNG ELECTRONICS CO., LTD., Suwon-si (KR)

(72) Inventors: Yongwon Cho, Suwon-si (KR); Hyeonwu Kim, Gyeongsangbuk-do (KR); Seok-Won Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 109 days.

(21) Appl. No.: 16/543,531

(22) Filed: Aug. 17, 2019

(65) Prior Publication Data

US 2020/0151109 A1 May 14, 2020

(30) Foreign Application Priority Data

Nov. 14, 2018 (KR) ........................ 10-2018-0140105

(51) Int. Cl.
*G06F 12/00* (2006.01)
*G06F 12/1009* (2016.01)

(52) U.S. Cl.
CPC .... *G06F 12/1009* (2013.01); *G06F 2212/657* (2013.01)

(58) Field of Classification Search
CPC ......... G06F 12/0804; G06F 2212/1021; G06F 2212/262; G06F 2212/608
See application file for complete search history.

(56) References Cited

U.S. PATENT DOCUMENTS

| 6,697,076 | B1 | 2/2004 | Trivedi et al. | |
|---|---|---|---|---|
| 9,213,632 | B1 | 12/2015 | Song et al. | |
| 9,690,695 | B2 | 6/2017 | Cheng | |
| 10,007,433 | B2 | 6/2018 | Hahn | |
| 2015/0098271 | A1* | 4/2015 | Lasser | G11C 16/10 365/185.11 |
| 2015/0186270 | A1* | 7/2015 | Peng | G11C 16/16 711/3 |
| 2016/0085796 | A1* | 3/2016 | Ki | G06F 16/122 707/695 |

(Continued)

FOREIGN PATENT DOCUMENTS

KR  101297442 B1  8/2013

*Primary Examiner* — Shawn X Gu
*Assistant Examiner* — Mohammad S Hasan
(74) *Attorney, Agent, or Firm* — Volentine, Whitt & Francos, PLLC

(57) ABSTRACT

A storage device includes a controller and a memory. In response to a request of a host, the controller generates: (A) a first list as a result of counting: (1) the number of first page numbers included in a first range among page numbers included in a logical address received from the host and (2) the number of second page numbers included in a second range not overlapping the first range, (B) generates a second list as a result of respectively grouping the first page numbers and the second page numbers based on the first list, and (C) translates the logical address to a physical address based on the second list and the first map data. The memory stores the first map data to be provided to the controller. The first map data matches the first page numbers and the second page numbers with respective physical addresses.

20 Claims, 12 Drawing Sheets

(56) References Cited

U.S. PATENT DOCUMENTS

| | | |
|---|---|---|
| 2016/0246726 A1 | 8/2016 | Hahn |
| 2016/0267016 A1* | 9/2016 | Lee et al. |
| 2016/0328183 A1* | 11/2016 | Hsieh .................... G06F 3/0653 |
| 2017/0075600 A1* | 3/2017 | Jung ..................... G06F 3/0685 |
| 2018/0039578 A1 | 2/2018 | Yun et al. |
| 2018/0275899 A1* | 9/2018 | Munsil ................ G06F 12/0811 |
| 2018/0373642 A1* | 12/2018 | Yang ....................... G06F 12/12 |
| 2019/0087284 A1* | 3/2019 | Kim ........................ G06F 3/064 |
| 2020/0089618 A1* | 3/2020 | Kim .................... G06F 12/0246 |

* cited by examiner

FIG. 7

| LPN | PPN |
|---|---|
| 1023 | PPN1 | }961~1024 loading
| 5 | PPN2 | }1~64 loading
| 65 | PPN3 | }65~128 loading
| 1 | PPN4 | }1~64 loading
| 192 | PPN5 | }129~256 loading random ↓

5 times (maximum)

FIG. 12

| Scheduled List | |
|---|---|
| LPN | PPN |
| 5 | PPN2 |
| 1 | PPN4 |
| 65 | PPN3 |
| 192 | PPN5 |
| 1023 | PPN1 |

1~64 loading (rows 1-2)
65~128 loading
129~256 loading
961~1024 loading 4 times (maximum)

STORAGE DEVICE FOR PERFORMING MAP SCHEDULING AND ELECTRONIC DEVICE INCLUDING THE SAME

CROSS-REFERENCE TO RELATED APPLICATION

This application claims priority under 35 U.S.C. § 119 to Korean Patent Application No. 10-2018-0140105 filed on Nov. 14, 2018, in the Korean Intellectual Property Office, the disclosure of which is incorporated by reference herein in its entirety.

BACKGROUND

Embodiments of the disclosure relate to a storage device and an electronic device, and more particularly, relate to a storage device and an electronic device for performing map scheduling.

As information communication technologies develop, various types of electronic devices are being used to exchanging information. An electronic device may include a storage device for storing data indicating a large amount of information. The storage device may store data based on various technologies and may output the stored data in response to a request of a user or a host. As semiconductor technologies are applied to the storage device, the performance of the storage device is being improved.

As the electronic device processes and generates a large amount of data, the storage device may include a high-capacity memory for processing a large amount of data. A dynamic random-access memory (DRAM) may be used as a memory included in the storage device. Upon designing the storage device, the memory causes higher costs than any other components included in the storage device.

Accordingly, a volatile-memory free storage device is being developed to satisfy a demand of a consumer on a low-priced storage device. For example, a technology is being developed which allows the storage device to use any other volatile memory present outside the storage device.

SUMMARY

Embodiments of the disclosure provide a storage device and an electronic device configured to perform map scheduling for improving a map hit rate upon being provided with map data from a host memory buffer outside the storage device.

According to an example embodiment, a storage device may include a controller and a memory. In response to a request of a host, the controller may generate a first list as a result of counting the number of first page numbers included in a first range among page numbers included in a logical address received from the host and the number of second page numbers included in a second range not overlapping the first range. The controller may generate a second list as a result of respectively grouping the first page numbers and the second page numbers based on the first list. The controller may translate the logical address to a physical address based on the second list and the first map data. The memory may store the first map data to be provided to the controller. The first map data may match the first page numbers and the second page numbers with respective physical addresses.

According to another example embodiment, a storage device includes a nonvolatile memory that stores a first logical-to-physical (L2P) address translation. The first L2P address translation includes a plurality of entries. Each of the entries maps a different logical address, among logical addresses within the first L2P address translation, to a corresponding physical address, among physical addresses within the first L2P address translation. A controller: (1) receives the entries from the nonvolatile memory and (2) creates a second L2P address translation in which each of predetermined ranges of the logical addresses is indexed according to a number of entries having a logical address within the range.

BRIEF DESCRIPTION OF THE FIGURES

The above and other objects and features of the disclosure will become apparent by describing in detail example embodiments thereof with reference to the accompanying drawings.

FIG. 7 is a conceptual diagram illustrating an example logical address received from a host of FIG. 1.

FIG. 12 is a conceptual diagram illustrating an example scheduled list generated by a scheduler of FIG. 6.

DETAILED DESCRIPTION

Below, embodiments of the disclosure may be described in detail and clearly to such an extent that an ordinary one in the art easily implements the disclosure.

Figure 1:
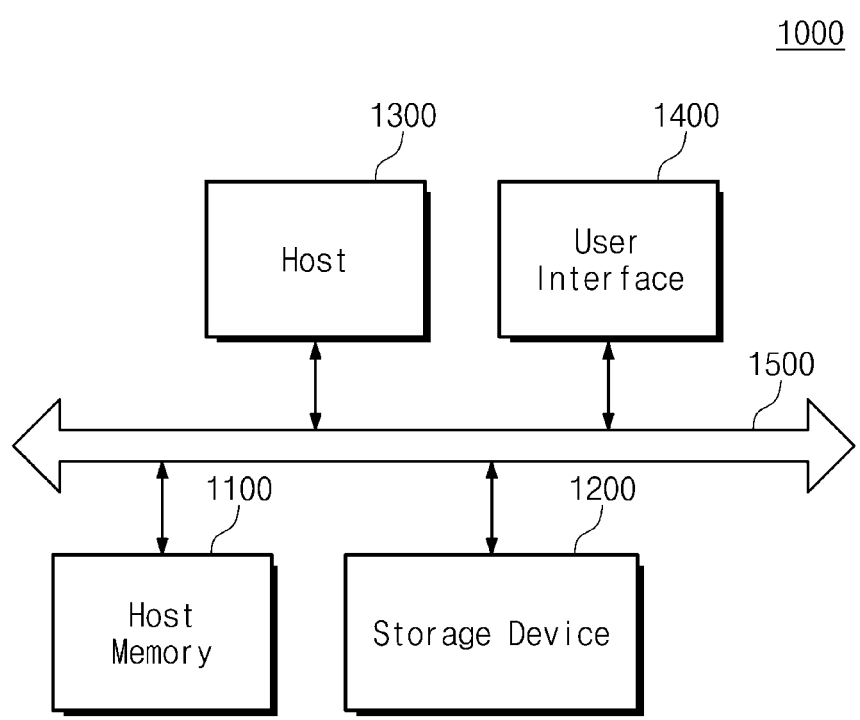
FIG. 1 is a block diagram illustrating an electronic device according to an embodiment of the disclosure.

FIG. 1 is a block diagram illustrating an electronic device according to an embodiment of the disclosure.

Referring to FIG. 1, an electronic device 1000 may include a host memory 1100, a storage device 1200, a host 1300, and a user interface 1400. For example, the electronic device 1000 may be one of a personal computer (PC), a workstation, a notebook computer, a mobile device, etc. The electronic device 1000 may further include at least one component (e.g., a communication block) not illustrated in FIG. 1. Alternatively, the electronic device 1000 may not include one or more of the components illustrated in FIG. 1.

The host memory 1100 may store data processed or to be processed by the host 1300 for operations of the electronic device 1000. For example, the host memory 1100 may include a volatile memory such as a static random-access memory (SRAM), a dynamic RAM (DRAM), a synchronous DRAM (SDRAM), etc., or various non-volatile memories such as a phase-change RAM (PRAM), a magneto-resistive RAM (MRAM), a resistive RAM (ReRAM), a ferroelectric RAM (FRAM), etc. Alternatively, the host memory 1100 may include heterogeneous memories.

The host memory 1100 may support a direct memory access (DMA) operation. Without intervention of the host 1300, a component of the electronic device 1000 or any other electronic device outside the electronic device 1000 may directly access the host memory 1100 and may use a storage space of the host memory 1100. For example, as will be described with reference to FIG. 2, the storage device 1200 may access the host memory 1100 and may use an allocated memory area in the host memory 1100 as a buffer.

The storage device 1200 may store data regardless of whether a power is supplied. For example, the storage device 1200 may be a storage medium, which includes non-volatile memories, such as a hard disk drive (HDD), a solid-state drive (SSD), a secure digital (SD) card, a universal serial bus (USB) memory device, etc.

The storage device 1200 may store data received from the host 1300 based on a logical address received from the host 1300. The storage device 1200 may store the data received from the host 1300 in the non-volatile memories included in the storage device 1200.

The storage device 1200 may include a flash translation layer (FTL) for translating a logical address received from the host 1300 to a physical address. For example, the storage device 1200 may include at least one processor core for implementing the flash translation layer.

Without intervention of the host 1300, the storage device 1200 may access the host memory 1100 and may use a memory area of the host memory 1100. For example, the storage device 1200 may use the memory area of the host memory 1100 as a buffer. Exemplary configurations and operations of the storage device 1200 will be more fully described with reference to FIG. 3.

The host 1300 may control overall operations of the electronic device 1000. The host 1300 which is a central control device may process operations necessary for an operation of the electronic device 1000. For example, the host 1300 may be one of a general-purpose processor, a workstation processor, an application processor, etc. To process operations of the electronic device 1000, the host 1300 may include a single processor core (or a single core) or may include a plurality of processor cores (or a multi-core). For example, the host 1300 may include a multi-core such as a dual-core, a quad-core, a hexa-core, or the like.

The user interface 1400 may transfer a command or data between the user and the electronic device 1000. The user interface 1400 may include various devices for transferring a command or data. For example, the user interface 1400 may include input devices such as a keyboard, a mouse, a touch panel, and a microphone and output devices such as a speaker and a display device.

A bus 1500 may provide a communication path between the components of the electronic device 1000. For example, the host memory 1100, the storage device 1200, the host 1300, and the user interface 1400 may exchange data with each other through the bus 1500. The bus 1500 may be configured to support various communication formats which are used in the electronic device 1000. The communication formats of the bus 1500 may support various interface protocols.

Figure 2:
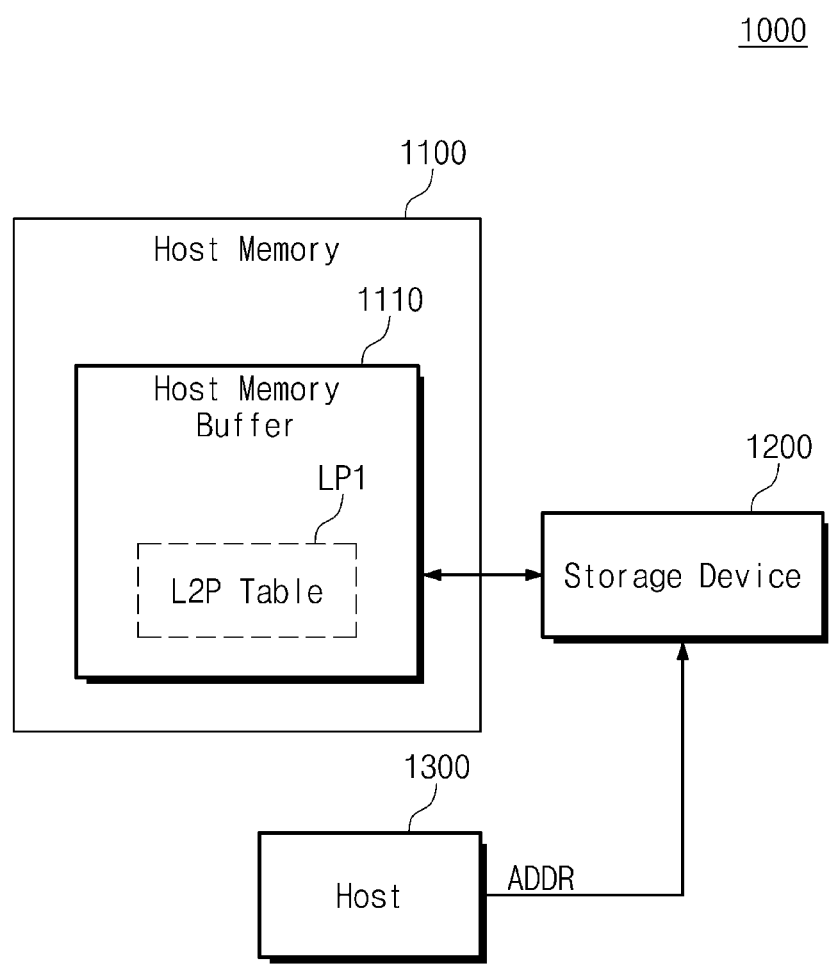
FIG. 2 is a block diagram illustrating an example configuration of a host memory of FIG. 1.

FIG. 2 is a block diagram illustrating an example configuration of a host memory of FIG. 1.

Referring to FIG. 2, the host memory 1100 may include a memory area allocated to support a DMA operation. For example, the host memory 1100 may include a host memory buffer 1110 allocated for an operation of the storage device 1200. For example, the host memory buffer 1110 may be allocated within a memory area of the storage device 1200 by the host 1300 of FIG. 1 or a separate controller (not illustrated) included in the host memory 1100.

As described with reference to FIG. 3, the storage device 1200 may include a memory area implemented with a flash memory for storing data. The host 1300 may output a logical address ADDR directing a specific position (e.g., a specific page) to the storage device 1200 for storing data at the specific position within the memory area of the storage device 1200 or reading data stored at the specific position.

The storage device 1200 may perform a logical to physical address translation (hereinafter referred to as "address translation") based on the received logical address ADDR. That is, the storage device 1200 may translate the received logical address ADDR to a physical address corresponding to the logical address ADDR. For example, the translated physical address may indicate a physical area (e.g., a page) of a memory area corresponding to the received logical address ADDR.

The storage device 1200 may access the host memory 1100 and may control some operations of the host memory 1100. For example, the storage device 1200 may control operations of the host memory 1100 through a DMA operation.

For example, under control of the storage device 1200, the host memory buffer 1110 may receive and/or output map data to be used for the address translation of the storage device 1200. For example, the host memory buffer 1110 may store a logical to physical (L2P) table LP1 including map data loaded from any other L2P table stored in the storage device 1200. Alternatively, the host memory buffer 1110 may output or flush map data included in the L2P table LP1 to the storage device 1200.

Hereinafter, the L2P table means a data table indicating matching between a logical address ADDR and a physical address for translating the logical address ADDR to the physical address. Hereinafter, the map data may mean all or a part of the L2P table as data extracted from the L2P table.

FIG. 2 shows one allocated host memory buffer 1110, but it may be well understood that the number of allocated host memory buffers 1110 may be variously changed and modified. Exemplary operations of the host memory buffer 1110 according to a request of the storage device 1200 will be described with reference to FIGS. 4 and 5.

Figure 3:
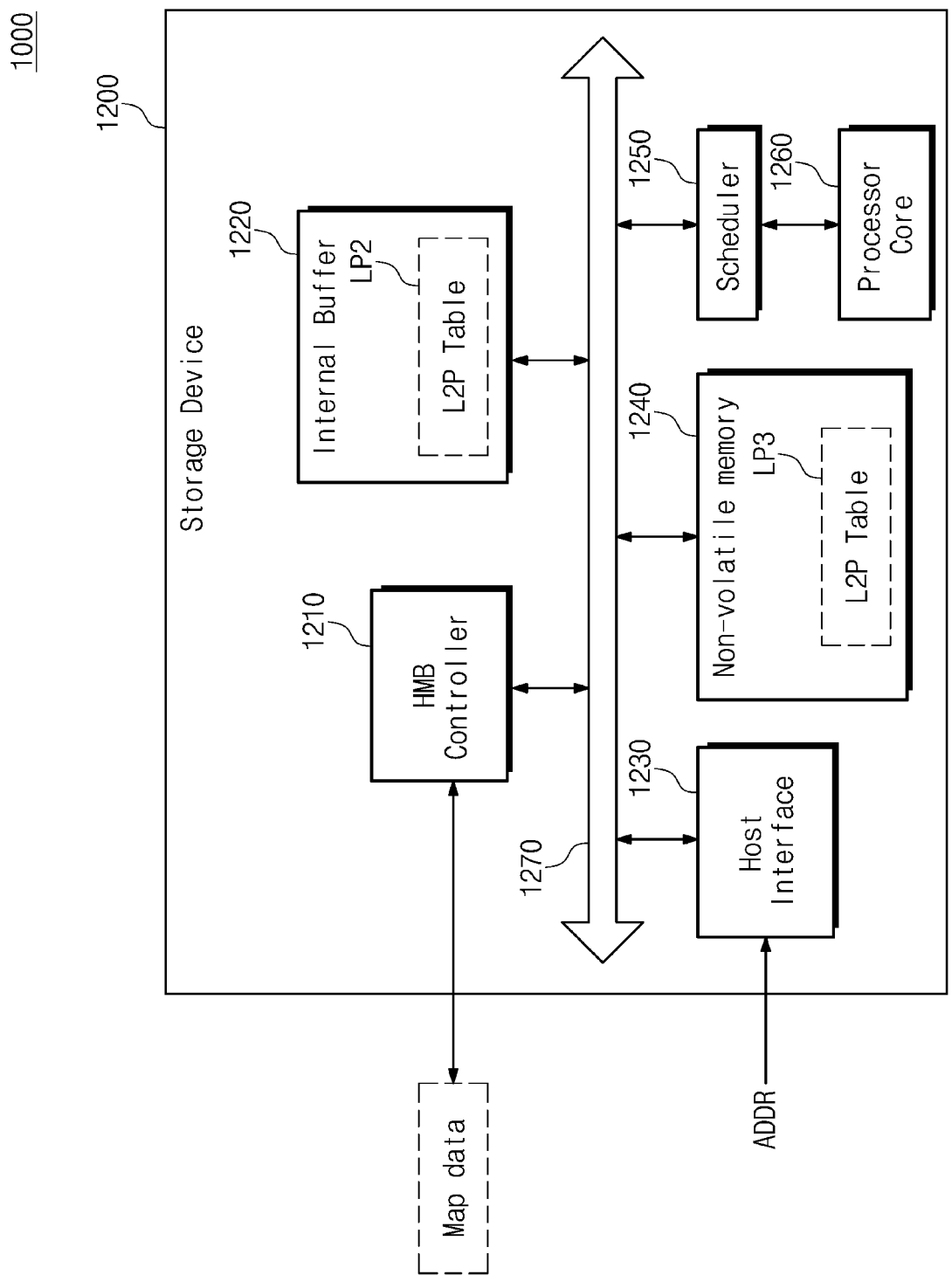
FIG. 3 is a block diagram illustrating an example configuration of a storage device of FIG. 1.

FIG. 3 is a block diagram illustrating an example configuration of a storage device of FIG. 1.

Referring to FIG. 3, the storage device 1200 may include a host memory buffer (HMB) controller 1210, an internal buffer 1220, a host interface 1230, a non-volatile memory 1240, a scheduler 1250, and a processor core 1260. The HMB controller 1210, the internal buffer 1220, the host interface 1230, the scheduler 1250, and the processor core 1260 of FIG. 3 may be included in a storage controller (not illustrated).

The host memory buffer controller 1210 may communicate with the host memory 1100 for accessing the host memory 1100 of FIG. 2 depending on a request of the processor core 1260. For example, the host memory buffer controller 1210 may exchange map data with the host memory buffer 1110 depending on a request of the processor core 1260.

In detail, the host memory buffer controller 1210 may transmit map data of the L2P table LP1 received from the host memory buffer 1110 to the processor core 1260. Alternatively, depending on a request of the processor core 1260, the host memory buffer controller 1210 may output map data to be stored in the host memory buffer 1110 to the host memory buffer 1110. FIG. 3 shows the host memory buffer controller 1210 positioned within the storage device 1200, but it may be understood that the host memory buffer controller 1210 is positioned outside the storage device 1200.

The internal buffer 1220 may store data to be processed by the processor core 1260 and the scheduler 1250. For example, the internal buffer 1220 may include a volatile memory such as an SRAM.

In response to a request of the processor core 1260, the internal buffer 1220 may store and/or output map data to be used for address translation. For example, the internal buffer 1220 may store an L2P table LP2 including map data to be used for address translation. The L2P table LP2 may be updated by map data loaded from the non-volatile memory 1240. The internal buffer 1220 may output map data included in the L2P table LP2 to the processor core 1260. The internal buffer 1220 may flush the L2P table LP2 to the non-volatile memory 1240.

The host interface 1230 may arbitrate communication between the host 1300 of FIG. 1 and the storage device 1200. As described with reference to FIG. 2, the host interface 1230 may receive the logical address ADDR from the host 1300. The host interface 1230 may transmit the received logical address ADDR to the scheduler 1250 and the processor core 1260.

The host interface 1230 may provide various communication formats for arbitrating communication between the host 1300 and the storage device 1200. For example, the host interface 1230 may support communication protocols such as universal serial bus (USB), advanced technology attachment (ATA), serial ATA (SATA), serial attached SCSI (SAS), parallel ATA (PATA), high speed interchip (HSIC), small computer system interface (SCSI), Firewire, peripheral component interconnection (PCI), PCI express (PCIe), non-volatile memory express (NVMe), universal flash storage (UFS), secure digital (SD), multimedia card (MMC), and embedded MMC (eMMC).

The non-volatile memory 1240 may store or output data requested by the host 1300. For example, the non-volatile memory 1240 may include a flash memory, a PRAM, an MRAM, a ReRAM, a FRAM, etc. for implementing the memory area described with reference to FIG. 2.

The non-volatile memory 1240 may store an L2P table LP3 to be used for translation of the logical address ADDR. The L2P table LP3 may include all mapping data necessary to translate the logical address ADDR received from the host 1300. For example, a designer of the storage device 1200 may store the L2P table LP3 in the non-volatile memory 1240 upon designing the storage device 1200.

The scheduler 1250 may perform map scheduling based on the logical address ADDR received from the host 1300. The scheduler 1250 may provide a scheduled logical address (a scheduled list to be described with reference to FIG. 6) to the processor core 1260. An exemplary configuration of the scheduler 1250 will be described with reference to FIG. 6. Exemplary map scheduling will be described with reference to FIGS. 8 to 11. For example, the scheduler 1250 may be implemented with a separate hardware circuit (e.g., an analog circuit or a logic circuit).

FIG. 3 shows the scheduler 1250 implemented with separate hardware, but operations which are similar to operations of the scheduler 1250 to be described with reference to FIGS. 8 to 11 may be performed by the processor core 1260. For example, operations of the scheduler 1250 may be implemented with a program code of software and/or firmware, and the processor core 1260 may execute an instruction set of the program code. The processor core 1260 may process various operations for executing the instruction set. FIG. 3 shows one processor core 1260, but it may be understood that the storage device 1200 may be variously modified to include a plurality of processor cores.

An on-chip bus 1270 may provide a communication path between the components of the storage device 1200. The on-chip bus 1270 may be configured to support various communication formats which are used in the electronic device 1000. The communication formats of the on-chip bus 1270 may support various interface protocols.

Designing of the storage device 1200 including the high-capacity internal buffer 1220 may cause a lot of costs and an increase in the size of the storage device 1200. Accordingly, it may be difficult to include the high-capacity internal buffer 1220 or a separate memory in the storage device 1200 upon designing a small-sized, cheap high-performance storage device 1200.

Instead, the storage device 1200 may secure sufficient buffer capacity by using the host memory buffer 1110 outside the storage device 1200 as a buffer. Accordingly, as the host memory buffer 1110 is provided to the storage device 1200, the storage device 1200 may operate with high performance despite a design for a low-priced, small-sized storage device.

Figure 4:
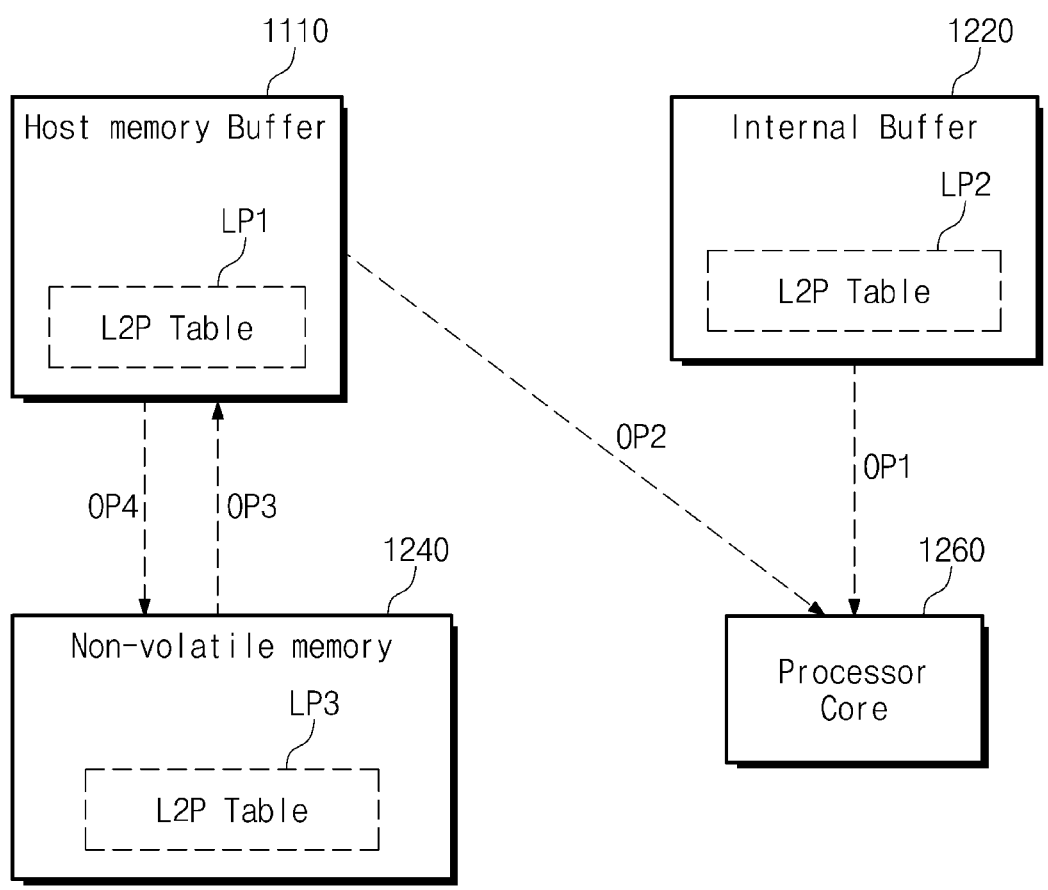
FIG. 4 is a block diagram illustrating example operations of a host memory buffer of FIG. 2 and an internal buffer, a non-volatile memory, and a processor core of FIG. 3.

FIG. 4 is a block diagram illustrating example operations of a host memory buffer of FIG. 2 and an internal buffer, a non-volatile memory, and a processor core of FIG. 3.

As described with reference to FIGS. 2 and 3, the host memory buffer 1110, the internal buffer 1220, the non-volatile memory 1240, and the processor core 1260 may exchange map data with each other.

For example, the processor core 1260 may request, from the internal buffer 1220, map data to be used to translate the logical address ADDR received from the host 1300. In a first operation OP1, the internal buffer 1220 may provide the processor core 1260 with map data included in the L2P table LP2 in response to a request of the processor core 1260.

For example, the processor core 1260 may request, from the host memory buffer 1110, map data to be used to translate the logical address ADDR received from the host 1300. In a second operation OP2, the host memory buffer 1110 may provide the processor core 1260 with map data included in the L2P table LP1 in response to a request of the processor core 1260.

For example, to obtain the map data for the second operation OP2, the non-volatile memory 1240 may perform a third operation OP3. In the third operation OP3, the map data may be loaded onto the host memory buffer 1110 from the non-volatile memory 1240. That is, the non-volatile memory 1240 may output map data included in the L2P table LP3 to the host memory buffer 1110, and the host memory buffer 1110 may store the map data received from the non-volatile memory 1240 as a portion of the L2P table LP1.

For example, a fourth operation OP4 may be performed to secure a storage space for the third operation OP3. In the fourth operation OP4, the host memory buffer 1110 may flush the map data of the L2P table LP1 to the non-volatile memory 1240. For example, the host memory buffer 1110 may flush all or a portion of the map data of the L2P table LP1 to the non-volatile memory 1240.

The first to fourth operations OP1 to OP4 which are performed over time will be more fully described with reference to FIG. 5.

Figure 5:
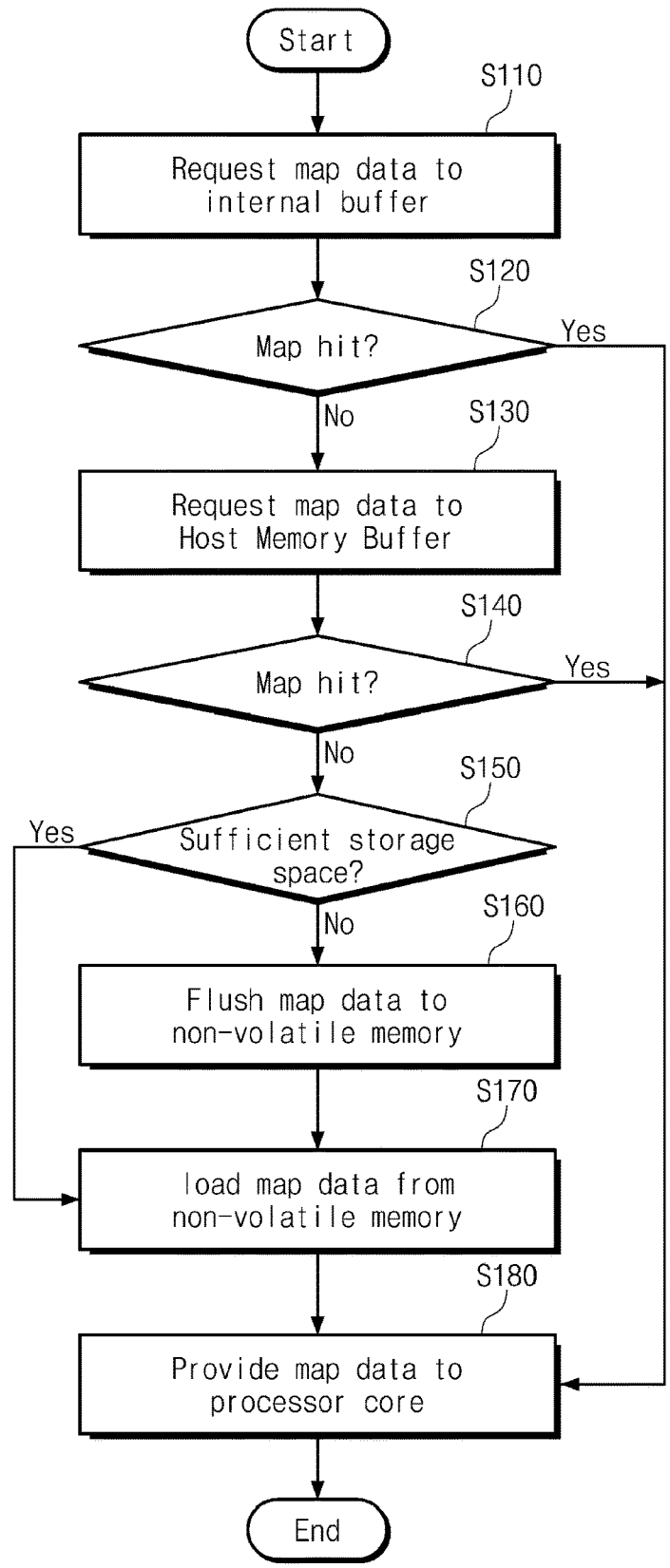
FIG. 5 is a flowchart illustrating example operations of a host memory buffer of FIG. 2 and an internal buffer, a non-volatile memory, and a processor core of FIG. 3.

FIG. 5 is a flowchart illustrating example operations of a host memory buffer of FIG. 2 and an internal buffer, a non-volatile memory, and a processor core of FIG. 3.

In operation S110, the processor core 1260 may request, from the internal buffer 1220, map data to be used to translate the logical address ADDR received from the host 1300.

In operation S120, when the map data requested in operation S110 are included in the L2P table LP2 stored in the internal buffer 1220 (in the case of a map hit), operation S180 may be performed. When the map data requested in operation S110 are not included in the L2P table LP2 stored in the internal buffer 1220 (in the case of a map miss), operation S130 may be performed.

In operation S130, the processor core 1260 may request, from the host memory buffer 1110, map data to be used to translate the logical address ADDR received from the host 1300.

In operation S140, when the map data requested in operation S130 are included in the L2P table LP1 stored in the host memory buffer 1110 (in the case of a map hit), operation S180 may be performed. When the map data requested in operation S130 are not included in the L2P table LP1 stored in the host memory buffer 1110 (in the case of a map miss), operation S150 may be performed.

In operation S150, the host memory 1100 may determine whether sufficient storage space is present in the host memory buffer 1110. In detail, the host memory 1100 may determine whether a storage space to store map data to be loaded from the non-volatile memory 1240 is present in the host memory buffer 1110. For example, the map data may be provided from the non-volatile memory 1240 in the unit of specific data (hereinafter referred to as a "loading data unit"). The data loading unit will be more fully described with reference to FIG. 7.

When a storage space, the capacity of which is greater than the loading data unit, is present in the host memory buffer 1110, operation S170 may be performed. When a storage space, the capacity of which is smaller than the loading data unit, is present in the host memory buffer 1110, operation S160 may be performed.

In operation S160, the map data stored in the L2P table LP1 stored in the host memory buffer 1110 may be flushed to the non-volatile memory 1240 (the fourth operation OP4 of FIG. 4). For example, all or a portion of the L2P table LP1 stored in the host memory buffer 1110 may be flushed to the non-volatile memory 1240.

In operation S170, map data to be provided to the processor core 1260 may be loaded onto the host memory buffer 1110 from the non-volatile memory 1240 (the third operation OP3 of FIG. 4). The L2P table LP1 of the host memory buffer 1110 may be updated by the loaded map data.

In operation S180, one, at which the map hit occurs, from among the internal buffer 1220 and the host memory buffer 1110 may provide map data to the processor core 1260 (the first operation OP1 or the second operation OP2 of FIG. 4).

It may be understood that the operations of FIG. 5 may be changed and modified not to include one or more of operation S110 to operation S180 or to include one or more other operations. For example, the storage device 1200 may further perform additional operations (e.g., an operation in which map data are loaded from the non-volatile memory 1240 to the internal buffer 1220 and/or an operation in which map data are flushed from the internal buffer 1220 to the non-volatile memory 1240) for using the internal buffer 1220 as a buffer in any order.

For example, in the case where an input/output operation of the internal buffer 1220 is faster in speed than an input/output operation of the host memory buffer 1110, the storage device 1200 may first use the internal buffer 1220 as a buffer. To this end, the storage device 1200 may perform the additional operations for using the internal buffer 1220 as a buffer prior to operation S150 to operation S170.

Figure 6:
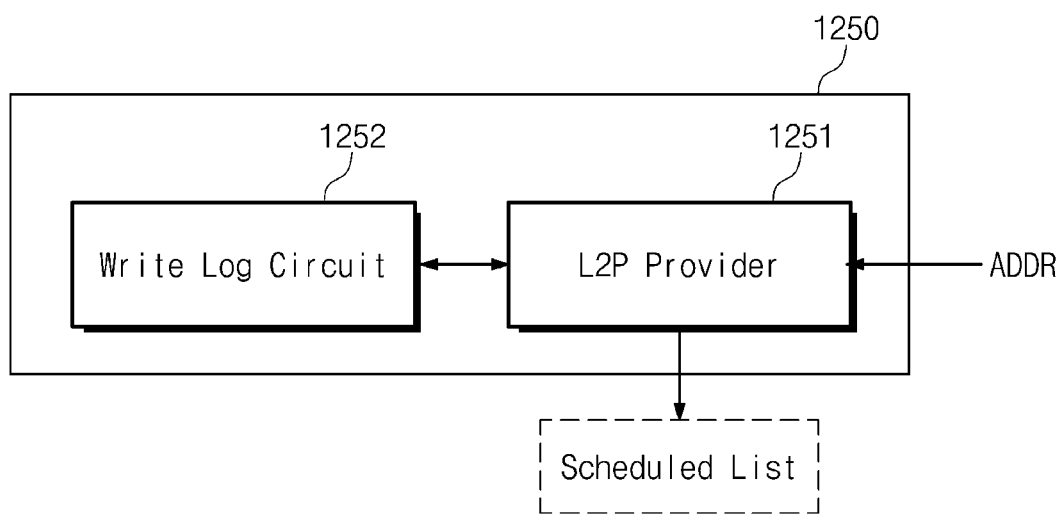
FIG. 6 is a block diagram illustrating an example configuration of the scheduler of FIG. 3.

FIG. 6 is a block diagram illustrating an example configuration of the scheduler 1250 of FIG. 3.

Referring to FIG. 6, the scheduler 1250 may include an L2P provider 1251 and a write log circuit 1252. The L2P provider 1251 may arbitrate communication between the write log circuit 1252 and the on-chip bus 1270. The L2P provider 1251 may modify a format of data processed by the write log circuit 1252 and may output data of the modified format to the on-chip bus 1270; alternatively, the L2P provider 1251 may modify a format of data received from the on-chip bus 1270 and may provide data of the modified format to the write log circuit 1252.

The write log circuit 1252 may receive the logical address ADDR from the host 1300 through the L2P provider 1251. For example, the logical address ADDR may include logical page numbers LPN of a random placement corresponding to a write command of the host 1300. An exemplary logical address ADDR will be more fully described with reference to FIG. 7.

The write log circuit 1252 may generate a scheduled list based on the received logical address ADDR. For example, the write log circuit 1252 may rearrange logical page numbers of the logical address ADDR to generate the scheduled list. The scheduler 1250 may provide the scheduled list to the processor core 1260. Exemplary map scheduling of the write log circuit 1252 for generating a scheduled list based on the logical address ADDR will be more fully described with reference to FIGS. 8 to 11.

FIG. 7 is a conceptual diagram illustrating an example logical address received from a host of FIG. 1.

Referring to FIG. 7, the logical address ADDR received from the host 1300 may include logical page numbers LPN of a random placement corresponding to a random write command of the host 1300. The maximum number of logical page numbers LPN capable of being included in the logical address ADDR may be determined according to a communication format between the host 1300 and the storage device 1200.

However, in FIG. 7, an order in which the logical page numbers LPN are arranged means an order in which the logical page numbers LPN are input from the host 1300 to the storage device 1200. Accordingly, that the placement of the logical page numbers LPN is random means that an order in which the logical page numbers LPN are input from the host 1300 to the scheduler 1250 of the storage device 1200 is random.

For example, the logical address ADDR may include maximum "1024" logical page numbers LPN (e.g., LPN1 to LPN1024). Below, for better description, an example of the logical address ADDR including 5 logical page numbers LPN will be described, but it may be understood the number of logical page numbers LPN included in the logical address ADDR may be variously changed. For example, the logical address ADDR may include one logical page number to 1024 logical page numbers.

For example, to translate the logical address ADDR received from the host 1300, the processor core 1260 may request map data (i.e., physical page numbers PPN1 to PPN5 corresponding to the requested logical page numbers LPN) corresponding to logical page numbers LPN of the logical address ADDR. Below, it is assumed that map data corresponding to the requested logical page numbers LPN are not included in the L2P table LP1 of the host memory buffer 1110 and the L2P table LP2 of the internal buffer 1220 (i.e., it is assumed that a map miss continuously occur at the internal buffer 1220 and the host memory buffer 1110).

Under this assumption, in the case where address translation is performed directly based on the received logical address ADDR, the host memory buffer 1110 may repeatedly perform operations (in particular, operation S170) of FIG. 5 for the purpose of obtaining map data including the physical page numbers PPN1 to PPN5.

The host memory 1100 may load map data from the non-volatile memory 1240 in the loading data unit. In an L2P table, one item indicating matching between one logical page number LPN and one physical page number PPN may have a specific size. For example, sizes of the loading data unit and one item may be determined upon designing the storage device 1200 in consideration of a capacity of the host memory buffer 1110, a communication format between the host memory 1100 and the processor core 1260, etc.

For example, in the case where the determined size of the loading data unit is "256[B]" and the determined size of the item of the L2P table is "4[B]", the host memory 1100 may load map data including 64 (=256/4) items from the L2P table LP3 of the non-volatile memory 1240 onto the host memory buffer 1110 through one loading operation. Also, the host memory 1100 may load items for continuous logical page numbers LPN in consideration of a locality.

In the example of FIG. 7, the host memory 1100 may load map data including continuous logical page numbers LPN961 to LPN1024 for obtaining the physical page number PPN1 corresponding to the logical page number LPN1023. As in the above description, the host memory 1100 may further load map data including 64 continuous items four times for obtaining the physical page numbers PPN2 to PPN5 corresponding to the logical page numbers LPN5, LPN65, LPN1, and LPN192.

Accordingly, the host memory 1100 may update the L2P table LP1 through five loading operations in response to a request of the processor core 1260. The host memory 1100 may provide the loaded map data to the processor core 1260 for address translation. However, the example described with reference to FIG. 7 is for better understanding. It may be understood that a loading operation may be performed four times or less in the case where a map hit occurs once or more in operation S120 and in operation S140 of FIG. 5.

FIGS. 8 to 11 are conceptual diagrams illustrating example operations of a write log circuit of FIG. 6.

Below, exemplary operations of the write log circuit 1252 included in the scheduler 1250 will be described with reference to FIGS. 8 to 11. However, as described with reference to FIG. 3, it may be understood that operations of FIGS. 8 to 11 may be performed by a program code executed by the processor core 1260.

Figure 8:
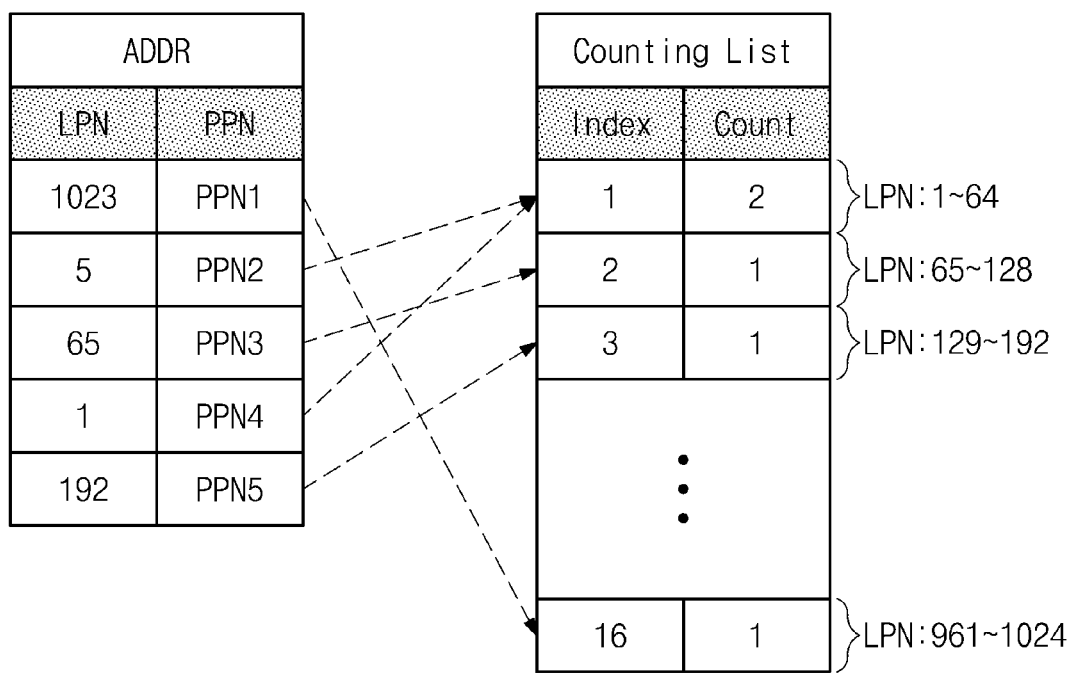
FIGS. 8 to 11 are conceptual diagrams illustrating example operations of a write log circuit of FIG. 6.

Referring to FIG. 8, the write log circuit 1252 may sort and count logical page numbers LPN of the received logical address ADDR and may generate a counting list. For example, the write log circuit 1252 may sort and count the number of logical page numbers LPN, based on ranges having the number (e.g., 64) of items corresponding to the loading data unit. The write log circuit 1252 may match the number of logical page numbers LPN counted with a relevant index.

In the example of FIG. 8, the write log circuit 1252 may count the number of logical page numbers LPN classified as a range of the continuous logical page numbers LPN1 to LPN64 and may match a counted value with index "1". As in the above description, the write log circuit 1252 may respectively match logical page number counts with index "1" to index "16", based on ranges of continuous logical page numbers.

For example, since the number of logical page numbers LPN classified as a range of the logical page numbers LPN1 to LPN64 is "2" (i.e., LPN1 and LPN5), the write log circuit 1252 may generate a count of "2" corresponding to index "1".

For example, since the number of logical page numbers LPN classified as a range of the logical page numbers LPN65 to LPN128 is "1" (i.e., LPN65), the write log circuit 1252 may generate a count of "1" corresponding to index "2".

For example, since the number of logical page numbers LPN classified as a range of the logical page numbers LPN129 to LPN192 is "1" (i.e., LPN192), the write log circuit 1252 may generate a count of "1" corresponding to index "3".

For example, since the number of logical page numbers LPN classified as a range of the logical page numbers LPN961 to LPN1024 is "1" (i.e., LPN1023), the write log circuit 1252 may generate a count of "1" corresponding to index "16".

Figure 9:
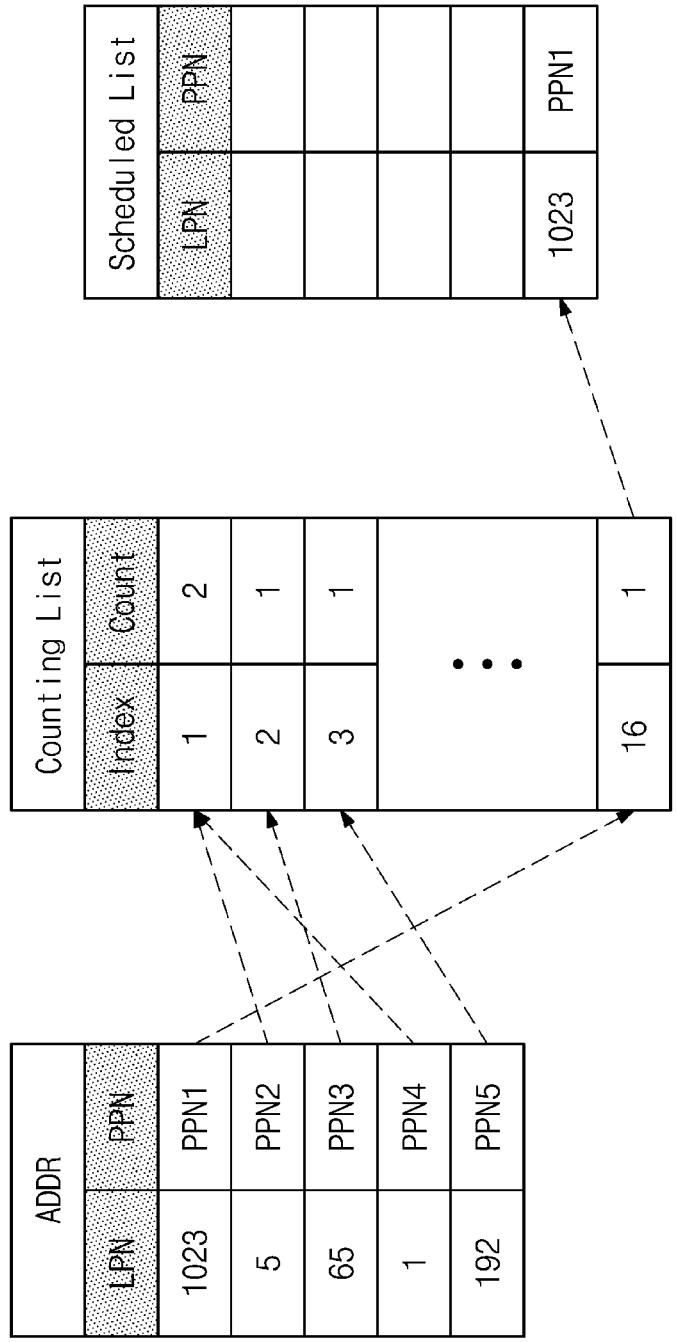
Figure 10:
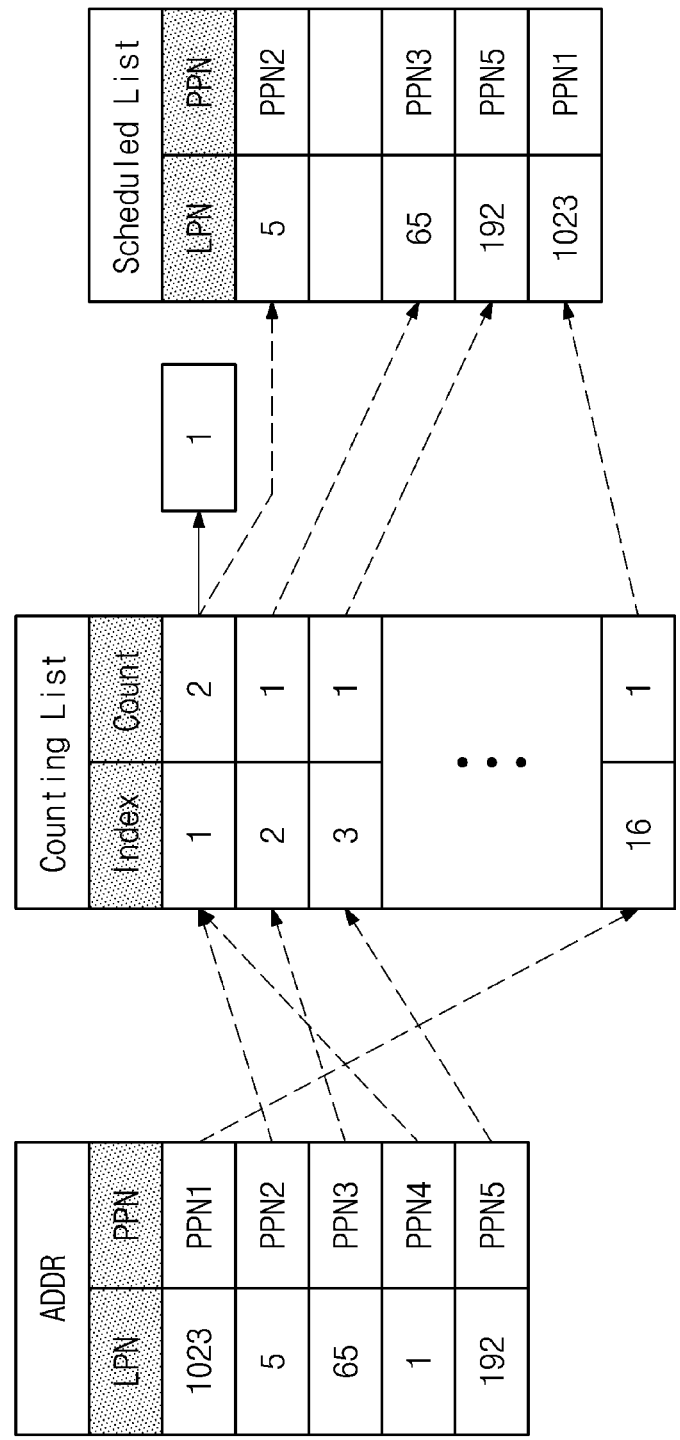
Figure 11:
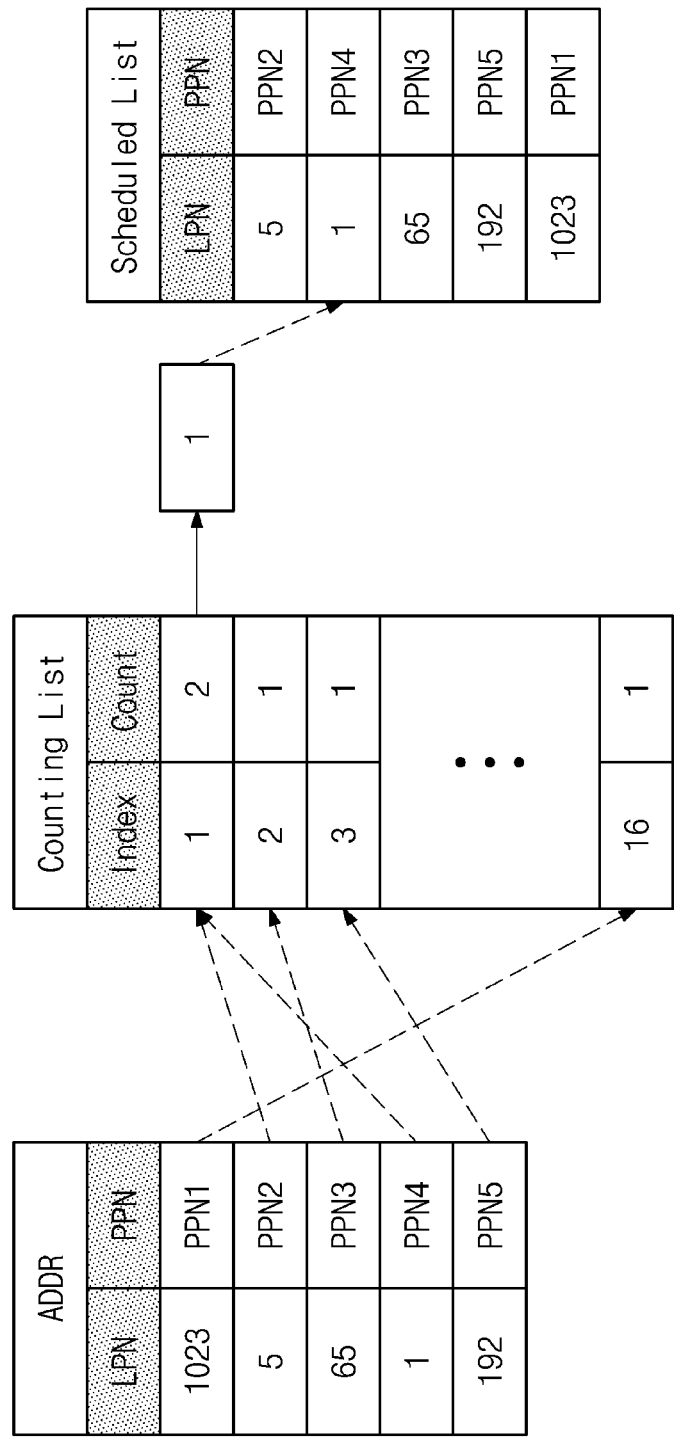

Referring to FIGS. 9 to 11, the write log circuit 1252 may generate a scheduled list based on the address ADDR received from the host 1300 and the counting list. FIGS. 9 to 11 show a scheduled list including 5 items, but it may be understood that the scheduled list may include the given number of items.

The write log circuit 1252 may place an item of a logical page number LPN matched with an index of the last order (e.g., with index "16") in consideration of the sum of counts recorded at the counting list in the scheduled list. However, hereinafter, the term "placement" means to include a logical page number LPN in an item of the scheduled list.

For example, the sum of counts recorded at the counting list may be "5". In this case, as illustrated in FIG. 9, the write log circuit 1252 may place an item of the logical page number LPN1023 matched with index "16" as the fifth item of the scheduled list.

The write log circuit 1252 may further place logical page numbers LPN in the scheduled list in consideration of an order of an index and a count. For example, in the case where the number of logical page numbers LPN matched with an index is not less than "2" (i.e., a count corresponding to an index is not less than "2"), the write log circuit 1252 may place a logical page number LPN matched with the index in the scheduled list and then may decrease the count associated with the index, within the counting list, by as much as "1". In the example illustrated by FIG. 10, the count value associated with the index of 1 within the counting list is decreased from 2 to 1.

Afterwards, the write log circuit 1252 may place logical page numbers LPN in the scheduled list depending on an order of an index (an order from index "1" to index "16"). However, in the case of an index, in which a count of the counting list remains after being decremented, the write log circuit 1252 may leave open (i.e., unscheduled) as many items of the scheduled list as the remaining count.

For example, in the example illustrated by FIG. 10, the write log circuit 1252 may place the logical page number LPN5 recorded at index "1", of the counting list, as the first item of the scheduled list. Afterwards, as also illustrated by FIG. 10, the write log circuit 1252 may decrease the count associated with index "1", within the counting list, from "2" to "1". In the case of the remaining count of "1" associated with index "1", the write log circuit 1252 may leave open (i.e., unscheduled) the second item (i.e., one item corresponding to the remaining count of "1" associated with the index of "1" within the counting list) of the scheduled list.

The write log circuit 1252 may place the logical page number LPN65 matched with index "2" as the third item of the scheduled list and may place the logical page number LPN192 matched with index "3" as the fourth item of the scheduled list.

In the example of FIG. 11, the write log circuit 1252 may place the logical page number LPN1 matched with index "1" as the second item of the scheduled list in correspondence with the count of "1". That is, the write log circuit 1252 may place the logical page number LPN1 as an item adjacent to an item where the logical page number LPN5 is placed. In the example of FIGS. 9 to 11, an embodiment in which the logical page number LPN5 is placed as the first item of the scheduled list and the logical page number LPN1 is placed as the second item of the scheduled list is described, but it may be understood that an order and a way to place the logical page numbers LPN1 and LPN5 may be variously changed and modified.

The map scheduling described with reference to FIGS. 8 to 11 may be performed during a fixed time interval. In detail, regardless of the placement of logical page numbers included in the received logical address ADDR, the scheduler 1250 and/or the processor core 1260 may perform map scheduling during a reference time. Accordingly, a length of the reference time may not be associated with the placement of logical page numbers LPN included in the logical address ADDR (i.e., an order in which logical page numbers LPN are input from the host 1300 to the scheduler 1250). The scheduler 1250 and/or the processor core 1260 may perform map scheduling during the reference time whenever a request (e.g., a request for a read/write operation) is received from the host 1300.

Example map scheduling is described with reference to FIGS. 8 to 11. However, it may be understood that the disclosure may include various embodiments for generating a scheduled list in which logical page numbers LPN classified as the same range are continuously placed (e.g., a scheduled list in which logical page numbers LPN1 and LNP5 included in a range of logical page numbers LPN1 to LPN64 are continuously placed), based on the logical address ADDR and the counting list.

However, hereinafter, to continuously place logical page numbers LPN means to group the logical page numbers LPN. Hereinafter, grouping means to generate a group of logical page numbers LPN as a group capable of being loaded from the non-volatile memory 1240 at the same time.

For example, the disclosure may perform all types of operations for generating a scheduled list configured such that logical page numbers LPN classified as the same range are grouped based on a counting list and the grouped logical page numbers LPN are loaded from the non-volatile memory 1240. FIG. 12 is a conceptual diagram illustrating an exemplary scheduled list generated by a scheduler of FIG. 6.

The processor core 1260 may request map data from a host memory buffer for translating the logical address ADDR received from the host 1300. Below, it is assumed that map data corresponding to the requested logical page numbers LPN are not included in the L2P table LP1 of the host memory buffer 1110 and the L2P table LP2 of the internal buffer 1220 (i.e., it is assumed that a map miss continuously occur at the internal buffer 1220 and the host memory buffer 1110).

Under this assumption, in the case where address translation is performed based on a scheduled list, the host memory buffer 1110 may repeatedly perform operations (in particular, operation S170) of FIG. 5 for the purpose of obtaining map data including the physical page numbers PPN1 to PPN5.

In the example of FIG. 12, the host memory 1100 may load map data including continuous logical page numbers LPN1 to LPN64 for obtaining the physical page numbers PPN2 and PPN4 corresponding to the logical page numbers LPN5 and LPN1. That is, since the logical page numbers LPN5 and LPN1 are together included in a range of index "1", the physical page numbers PPN2 and PPN4 may be obtained through one loading operation.

As in the above description, the host memory 1100 may further load map data including 64 continuous items, in each of three iterations, to obtain the physical page numbers PPN3, PPN5, and PPN1 corresponding to the logical page numbers LPN65, LPN192, and LPN1023.

Accordingly, the host memory 1100 may update the L2P table LP1 through a maximum of four loading operations in response to a request of the processor core 1260. However, the example described with reference to FIG. 12 is for better understanding. It may be understood that a loading operation may be performed three times or less in the case where a map hit occurs once or more in operation S120 and in operation S140 of FIG. 5.

The host memory 1100 may provide the loaded map data to the processor core 1260 for address translation. Afterwards, the processor core 1260 may perform address translation based on map data provided from the host memory 1100. That is, the processor core 1260 may perform an operation corresponding to the flash translation layer in response to a request of the host 1300.

Referring to FIGS. 7 and 12, the number of loading operations (operation S170 of FIG. 5) of the host memory 1100 performed based on a scheduled list may be less than the number of loading operations of the host memory 1100 performed directly based on the logical address ADDR. That is, by the map scheduling described with reference to FIGS. 8 to 11, a map hit rate may increase in the process of obtaining map data for address translation. As the map hit rate increases, a time necessary for the address translation may decrease and, thus, a speed at which the storage device 1200 operates in response to a request of the host 1300 may increase.

According to an embodiment of the disclosure, a time taken for a storage device to translate a logical address received from a host may decrease and, thus, a speed at which the storage device operates in response to a request of the host may increase.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the disclosure has been described with reference to exemplary embodiments thereof, it will be apparent to those of ordinary skill in the art that various changes and modifications may be made thereto without departing from the spirit and scope of the disclosure as set forth in the following claims.

What is claimed is:

1. A storage device comprising:
a controller configured to:
in response to a request of a host, generate a first list identifying a count of first page numbers and second page numbers, wherein the first page numbers are included in a first range among page numbers included in a logical address received from the host and the second page numbers are included in a second range not overlapping the first range,
generate a second list that groups the first page numbers and the second page numbers, based on the first list, and
translate the logical address to a physical address based on the second list and first map data; and
a memory configured to store the first map data to be provided to the controller, wherein
the first map data match the first page numbers and the second page numbers with the physical address.

2. The storage device of claim 1, wherein the controller is further configured to access a host memory to communicate with the host memory, for requesting the first map data.

3. The storage device of claim 1, wherein the controller is further configured to:
request second map data from a host memory based on the second list, and
translate the logical address further based on the second map data.

4. The storage device of claim 3, wherein:
the memory is further configured to store a data table that matches the physical address with the logical address, and
the first map data are included in the data table.

5. The storage device of claim 4, wherein the second map data are associated with the first map data loaded from the data table to the host memory.

6. The storage device of claim 4, wherein the controller is further configured to obtain physical page numbers corresponding to the first page numbers, based on the first map data loaded onto the host memory at one time.

7. The storage device of claim 1, wherein the controller is further configured to generate the second list based on a number of the page numbers included in the logical address.

8. The storage device of claim 1, wherein:
the controller is further configured to generate the second list during a reference time, and
a length of the reference time is not associated with an order in which the page numbers included in the logical address are received by the controller.

9. The storage device of claim 1, wherein:
the first list includes a first index associated with the first range and a first count indicating the count of the first page numbers, and
the first count is matched with the first index.

10. The storage device of claim 9, wherein when the first count is not smaller than "2", the controller is further configured to:
include one of the first page numbers in a first item of the second list, and decrease the first count as much as "1".

11. The storage device of claim 10, wherein the controller is further configured to include another of the first page numbers in a second item to be grouped with the first item.

12. A storage device comprising:
a controller configured to:
in response to a request of a host, for translating a logical address received from the host to a physical address, access a host memory to obtain first map data, and
perform a scheduling, during a reference time, for generating a first list including grouped first page numbers and grouped second page numbers, based on the logical address including the first page numbers of a first range and the second page numbers of a second range,
wherein:
the first map data match the first page numbers and the second page numbers with the physical address, and
a length of the reference time is not associated with an order in which the first page numbers and the second page numbers are received by the controller.

13. The storage device of claim 12, wherein:
the controller is further configured to:
match a first count, indicating a number of the first page numbers, with a first index indicating the first range, and
match a second count, indicating a number of the second page numbers, with a second index indicating the second range, and
the first list includes the first index, the first count, the second index, and the second count.

14. The storage device of claim 12, further comprising:
a memory configured to store second map data to be loaded onto the host memory, wherein
the second map data include the first map data.

15. The storage device of claim 14, wherein:
the second map data are loaded onto the host memory in a loading data unit, and
a size of the loading data unit is associated with a capacity of the host memory.

16. The storage device of claim 15, wherein a size of the first range and a size of the second range are associated with the loading data unit.

17. The storage device of claim 15, wherein:
the first page numbers are respectively included in items of the first list, and
the items including the first page numbers are grouped.

18. The storage device of claim 12, further comprising:
a memory configured to store second map data to be loaded onto the host memory, wherein
the controller is further configured to obtain physical page numbers corresponding to the first page numbers, based on the second map data loaded onto the memory at one time.

19. An electronic device comprising:
a storage device configured to:
in response to a request of a host, generate a first list identifying a count of first page numbers and second page numbers, wherein the first page numbers are included in a first range among page numbers included in a logical address received from the host and the second page numbers are included in a second range not overlapping the first range, generate a second list that groups the first page numbers and the second page numbers based on the first list, and request map data based on the second list; and a host memory positioned outside the storage device and configured to provide the map data to the storage device in response to a request of the storage device.

20. The electronic device of claim 19, wherein:

the storage device includes a controller configured to translate the logical address to a physical address based on the requested map data, and the map data match the logical address with the physical address.

* * * * *